United States Patent [19]

Onogi

[11] 3,896,366

[45] July 22, 1975

[54] D.C. TO D.C. CONVERTER WITH CONDUCTIVE ISOLATION

[75] Inventor: Seiji Onogi, Kamakura, Japan

[73] Assignee: Yamatake-Honeywell Company Limited, Tokyo, Japan

[22] Filed: Sept. 28, 1973

[21] Appl. No.: 401,706

[30] Foreign Application Priority Data

Sept. 29, 1972 Japan .............................. 47-97801
Sept. 29, 1972 Japan .............................. 47-97802
Sept. 29, 1972 Japan .............................. 47-97803

[52] U.S. Cl. .................... 321/16; 323/44 R; 323/88; 324/62 R; 324/118; 332/51 R

[51] Int. Cl. .......................... H02p 13/04; G05f 7/00

[58] Field of Search ............ 321/8 R, 16; 324/62 R, 324/118, 120, 127, 65 R; 323/6, 44 R, 60, 88; 332/12, 51 R, 56; 330/8; 336/30

[56] References Cited

UNITED STATES PATENTS

| | | | |
|---|---|---|---|
| 2,552,088 | 5/1951 | Davis | 324/65 R |
| 2,795,752 | 6/1957 | Roberts | 321/25 |
| 2,885,637 | 5/1959 | Triman | 324/65 R |
| 3,065,399 | 11/1962 | McNamee | 323/88 |
| 3,086,159 | 4/1963 | Daly | 323/88 |
| 3,409,822 | 11/1968 | Wanlass | 323/22 T |
| 3,581,184 | 5/1971 | Hurd | 324/118 |
| 3,590,362 | 6/1971 | Kakalec | 323/60 |

OTHER PUBLICATIONS

IBM Technical Disclosure Bulletin, "Patient Isolated Impedance Monitor," Vol. 15, No. 2, p. 615, July 1972.

*Primary Examiner*—William H. Beha, Jr.
*Attorney, Agent, or Firm*—Arthur H. Swanson; Lockwood D. Burton

[57] ABSTRACT

A d.c. isolation amplifier includes an isolating transformer one winding of which is driven by an a.c. source. A controlled load impedance is applied across a second winding of the transformer. The impedance of the load is controlled in accordance with the magnitude of a d.c. input signal. The current in all of the windings of the transformer is thus controlled as a function of the magnitude of the input signal.

8 Claims, 21 Drawing Figures

D.C. TO D.C. CONVERTER WITH CONDUCTIVE ISOLATION

BACKGROUND OF THE INVENTION

1. Field of the Invention

The present invention relates to d.c. isolation means, and more particularly, to a d.c. to d.c. converter with conductive isolation.

2. Description of the Prior Art

It is, from time to time, desirable or necessary that d.c. control signals be applied to a control instrumentality while maintaining conductive isolation between the source of d.c. control signals and the control instrumentality. Heretofore, means have been provided for accomplishing that end. The prior devices have, however, required a chopper of one type or another. Further, such prior systems have required precision choppers, high quality transformers and the like to produce reliable results. Exemplary of such prior devices are the following U.S. Patents. Hurd — U.S. Pat. No. 3,581,184; Braymer — U.S. Pat. No. 3,130,373; Bell — U.S. Pat. No. 3,089,097; and Neff — U.S. Pat. No. 2,832,848. In such prior structures, the necessary components are both complex and expensive.

SUMMARY OF THE INVENTION

It is an object of the present invention to provide an improved signal transducer.

It is another object of the present invention to provide an improved signal transducer which features conductive isolation between input and output and yet is capable of transmitting d.c. signals.

In accomplishing these and other objects, there has been provided in accordance with the present invention, an isolation amplifier system which includes an isolating transformer one winding of which is driven from a constant a.c. source, the current in each of the windings being controlled by a signal responsive impedance means. The output signal is derived from the controlled current in one of the windings.

DETAILED DESCRIPTION OF THE EMBODIMENTS

Figure 1:
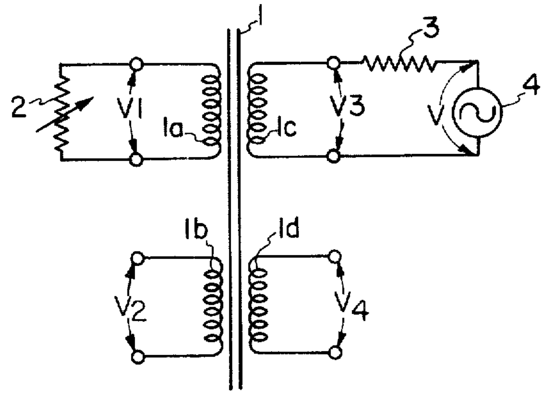
FIG. 1 is a schematic diagram illustrating the principles of the present invention.

In the schematic diagram, FIG. 1, there is shown a transformer 1 having a control winding 1*a*, a feedback winding 1*b*, a primary or exciter winding 1*c* and an output winding 1*d*. The number of turns of the several windings may be designated $N_1$, $N_2$, N3, and N4, respectively. The actual number of turns or the turns ratios are a matter of choice as required by the gain characteristics as required by the system implementation. Across the terminals of the control winding 1*a* there is connected a variable impedance, load element 2. Connected in series across the exciter winding 1*c* there is a fixed resistor 3 and a constant a.c. source 4. The magnitude of the impedance of the load element 2 will be designated $R_L$, while the magnitude of the fixed resistor 3 will be designated as R, and the voltage across the a.c. source as V. The resultant voltages across the terminals of the several windings are $v_1$, $v_2$, $v_3$, and $v_4$, respectively.

Operationally, it may be seen that if the feedback winding 1*b* and the output winding 1*d* of the transformer 1 are left open, and the excitor winding 1*c* is driven from the a.c. source 4 through the resistor 3, the effect of the load element 2, connected across the control winding 1*a*, on the energization of the exciter winding 1*c* is given by the expression $n^2R_L$. In this instance, $n=N_3/N_1$. Therefore, the voltage $V_3$ across the terminals of the driving winding 1*c* is given by equation (1) as follows:

$$V_3 = \frac{Vn^2 R_L}{R + {}_n2R_L} \quad (1)$$

In the same way, the voltages $V_1$, $V_2$ and $V_4$ across terminals of the control winding 1*a*, the feedback wind 1*b* and the output winding 1*d*, respectively can be given by equations (2), (3), & (4), as follows:

$$V_1 = \frac{N_1}{N_3} V_3 = \frac{N_1}{N_3} \cdot \frac{V_n 2R_L}{R + {}_n2R_L} \quad (2)$$

$$V_2 = \frac{N_2}{N_3} V_3 = \frac{N_2}{N_3} \cdot \frac{V_n 2R_L}{R + {}_n2R_L} \quad (3)$$

$$V_4 = \frac{N_4}{N_3} V_3 = \frac{N_4}{N_3} \cdot \frac{V_n 2R_L}{R + {}_n2R_L} \quad (4)$$

From the foregoing equations it may be seen that the loading of the transformer and hence the voltages $V_1$, $V_2$, $V_3$, and $V_4$, across the terminals of the several winding can be controlled by the impedance $R_L$ of the load element 2, while the number of turns $N_1$ to $N_4$ of the windings, the value R of the resistor 3 and the voltage V of the a.c. source 4 all remain constant. This characteristic may now be incorporated into a closed loop transducer. In this respect, a signal derived from the terminals of the feedback winding 1*b* may be applied in feedback relation to the input of the system such that the impedance $R_L$ of the load element 2 is controlled in accordance with the difference between an input signal and the feedback signal.

An example of a circuit utilizing the foregoing principle is illustrated in simple block form in FIG. 2. An input signal is applied across a pair of input terminals 5*a* and 5*b*. The input terminal 5*a* is connected through an input resistor 10 to an input terminal 6*a* of a differential amplifier 6. The output terminal of the amplifier 6 is connected to a control terminal of a current limiter 7. A rectifier 12 is connected to the terminals of the control winding 1*a* of the transformer 1. The output of the rectifier 12 is coupled to the current limiter 7 such that output current from the rectifier 12, hence the current in the control winding 1*a* is under the control of the current limiter 7. A rectifier 13, similar to the rectifier 12, is connected across the terminals of the feedback winding 1*b*. One output terminal of the rectifier 13 is coupled through a series feedback resistor 11 to the second input terminal 6*b* of the differential amplifier 6. The other output terminal of the rectifier 13 is connected to a common lead which is, in turn, connected to the second input terminal 5*b*. A battery 8 and a battery 9 are illustrated as providing appropriate bias signals for the amplifier 6. The amplifier 6 and the current limiter 7 together constitute an input voltage to impedance converter 16. Another rectifier 14, again similar to the rectifier 12, is connected across the terminals of the output winding 1*d* of the transformer 1 whereby to develop a d.c. output signal at the output terminals 15*a* and 15*b*, which is proportional to the d.c. input signal applied to the input terminals 5*a* and 5*b*.

Figure 2A:
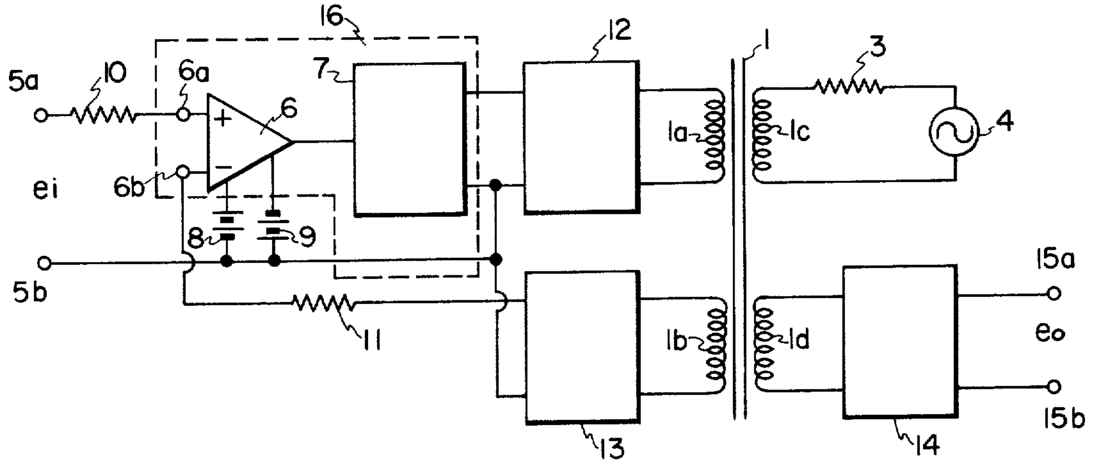
FIGS. 2*a* and *b* are a schematic circuit diagrams of an amplifier embodying the present invention.
Figure 2B:
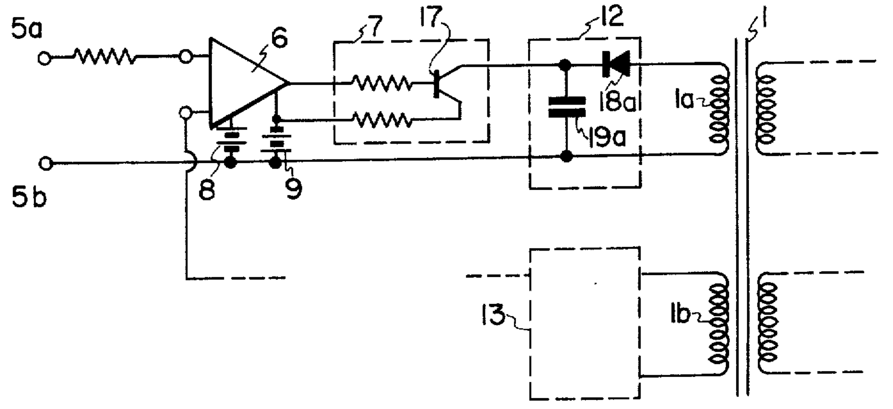

While the implementation of a transducer embodying the present invention has been rather generally depicted in block diagram form in FIG. 2*a*, a more specific and practical circuit arrangement is illustrated in FIG. 2*b*. There the current limiter 7 is shown as including a transistor 17 having its emitter connected to one terminal of the rectifier 12, the collector connected through a resistor to the negative terminal of the bias battery 9, thence to the common lead connected to the second input terminal 5*b*. The base electrode of the transistor 17 is connected, through a coupling resistor, to the output terminal of the differential amplifier. The rectifier 12 is shown as including a diode 18 serially connected between one of the terminals of the control winding 1*a* and the emitter electrode of the transistor 17. The other terminal of the control winding 1*a* is connected to the aforementioned common lead. A filter capacitor 19 is connected between the cathode of the diode 18 and the common lead. A similar rectifier arrangement would be included in the feedback circuit, rectifier 13 and in the output circuit, rectifier 14.

Figure 3A:
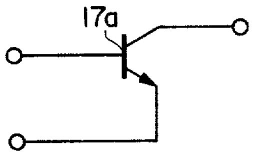
FIGS. 3*a* and *b* are schematic representations of controlled impedance means suitable for use in apparatus embodying the present invention.
Figure 3B:
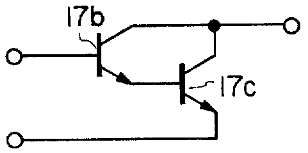

In FIG. 3*a*, there is illustrated a controlled current limiting device similar to that shown in FIG. 2*b* but showing an NPN transistor 17*a* instead of the PNP transistor of FIG. 2*b*. In FIG. 3*b* another form of controlled current limiting device. Here two transistors 17*b* and 17*c* are connected in a Darlington pair arrangement. In both cases (FIG. 3*a* and FIG. 3*b*) the inter connection of the current limiting device would be similar to that shown in FIG. 2*b*.

Figure 4A:
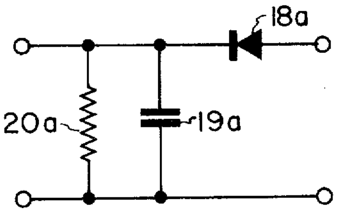
FIGS. 4*a* to *d* are schematic representations of rectifying means suitable for use in apparatus embodying the present invention.
Figure 4B:
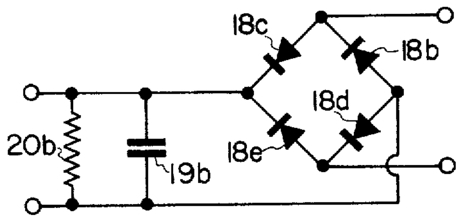

In FIGS. 4*a* through 4*d* there are illustrated various forms of rectifying means suitable for use in the several rectifiers 12, 13 or 14 of FIGS. 2*a* or 2*b*. The circuit shown in FIG. 4*a* is similar to the half-wave rectifier shown in FIG. 2*b* and includes a diode rectifier 18*a* and a filter capacitor 19*a*. There is added, however, a filter resistor 20*a*. The connection would be similar to that shown in FIG. 2*b*. In FIG. 4*b* there is shown a full-wave rectifier form of apparatus and includes a diode bridge comprised of the four diodes 18*b*, 18*c*, 18*d*, 18*e*. The output of the bridge is connected to a parallel arrangement of a filter capacitor 19*b* and a filter resistor 20*b*.

Figure 4C:
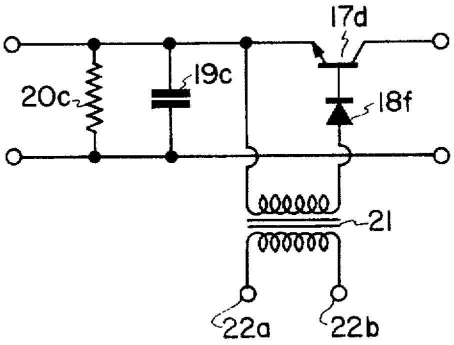
Figure 4D:
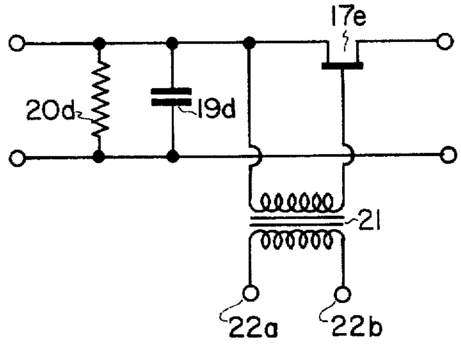

In FIG. 4*c* there is shown a synchronous demodulator type of rectifier arrangement. In that arrangement, a switching transistor 17*d* is arranged to have its collector connected to the first terminal of the control winding 1*a* and its emitter connected to the current limiter 7. A pair of terminals 22*a* and 22*b* of the primary winding of a coupling transformer 21 is arranged to be connected to the a.c. source 4 of FIGS. 1 and 2*a*. The secondary winding of the transformer 21 has one terminal connected to the emitter electrode of the transistor 17*d* while the other terminal of the secondary winding of the transformer 21 is connected through a diode 18*f* to the base electrode of the transistor 17*d*. An alternate half cycle of the a.c. source, the transistor 17*d* is alternately biased into conduction and non-conduction, effectively half-wave rectifying the signal. The output of this rectifier is also connected across a parallel arrangement of a filter capacitor 19*c* and a filter resistor 20*c*. A similar arrangement is shown in FIG. 4*d* but with a field effect transistor 17*e* substituted for the transistor 17*d* and diode 18*f* of FIG. 4*c*.

Figure 5:
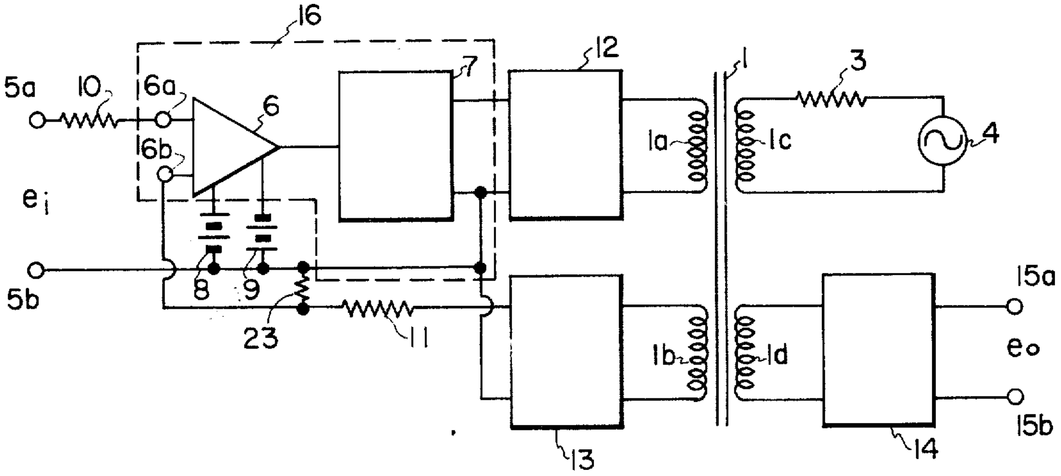
FIG. 5 is a schematic circuit diagram of an amplifier embodying the present invention, slightly different from that shown in FIG. 2.

In FIG. 5 there is shown a block diagram of a circuit similar to that shown in FIG. 2*a* but with a modification of the feedback arrangement. Whereas the circuit of FIG. 2*a* featured a current feedback arrangement, in the circuit of FIG. 5 means are provided for a voltage feedback. To this end, a resistor 23 is connected between the common lead connected to the input terminal 5*b* and the junction between the resistor 11 and the amplifier input terminal 6*b*. Thus a voltage signal proportional to the feedback current signal is developed across the resistor 23 and fed back to the input terminal 6*b* of the amplifier 6.

Figure 6:
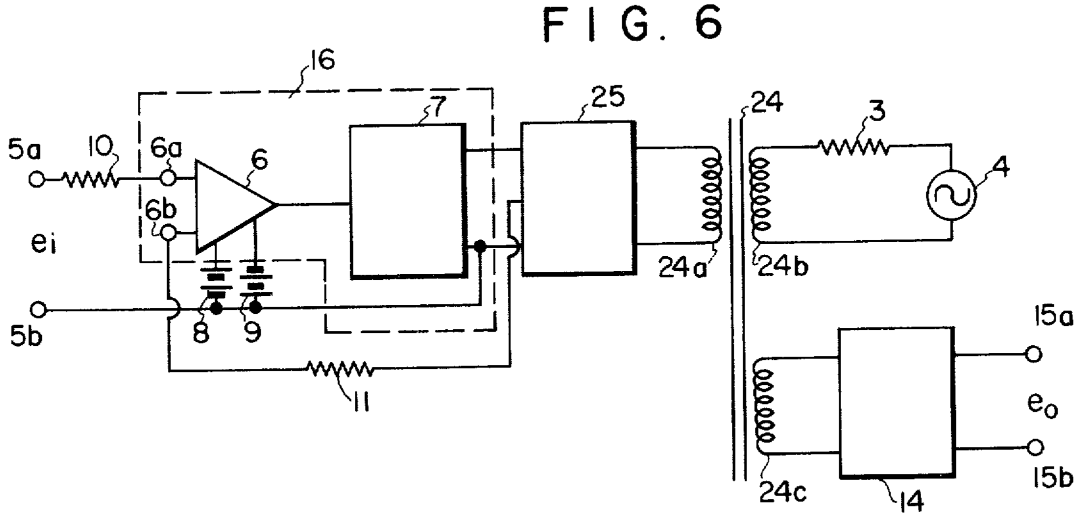
FIG. 6 is a schematic diagram of a different circuit also embodying the present invention.
Figure 7:
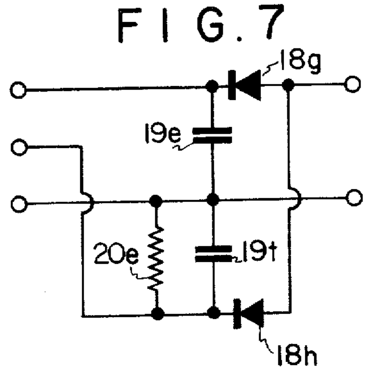
FIG. 7 is a schematic representation of a rectification scheme suitable for use in the circuit shown in FIG. 6.

In FIG. 6 there is illustrated, again in block diagram form, which is similar to that shown in FIG. 2*a* with the exception that means have been provided for eliminating a separate feedback winding on the transformer 1. To this end, a transformer 24 having only three winding, (a control winding 24*a*, an exciter winding 24*b* and an output winding 24*c*) is provided. The avoidance of the need for a feedback winding is accomplished by the use of a double rectifier 25 connected to the control winding 24*a*. Exemplary of the double rectifier 25 is the structure illustrated in FIG. 7. A first diode 18*g* is serially connected, in the same manner as the diode 18*a* of FIG. 2*b*, between a first terminal of the control winding 24*a* and the current limiter 7. Again, a filter capacitor 19*e* is connected between the cathode of the diode 18*g* and the common lead which is, in turn, connected to the second terminal of the control winding 24*a*. That much of the rectifier 25 operates in the same manner as the rectifier 12 of FIG. 2*b*. A second diode 18*h* is serially connected between the first terminal of the control winding 24*a* and the feedback lead. Between the cathode of the diode 18*h* and the common lead connected to the second terminal of the control winding 24*a* there is connected a parallel arrangement of a filter capacitor 19*f* and a filter resistor 20*e*. This portion of the rectifier 25 is substantially identical to the rectifier shown in FIG. 4*a*. The two portions of the rectifier 25 are connected in parallel, and both are connected to the two terminals of the winding 24*a*. Since the voltage developed across the terminals of the winding is controlled by the current limiter 7 in accordance with equation (2), the feedback signal is again determined by the controlled impedance or current limiter 7, and without the need of a separate feedback winding on the transformer.

Figure 8:
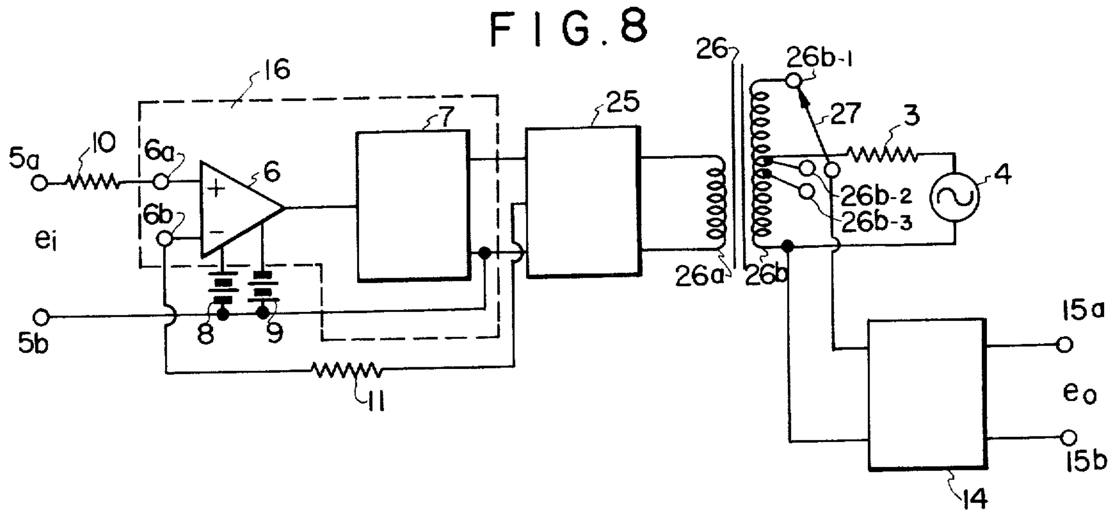
FIG. 8 is a schematic diagram of a circuit similar to that of FIG. 6 but illustrating a different structure.
Figure 9:
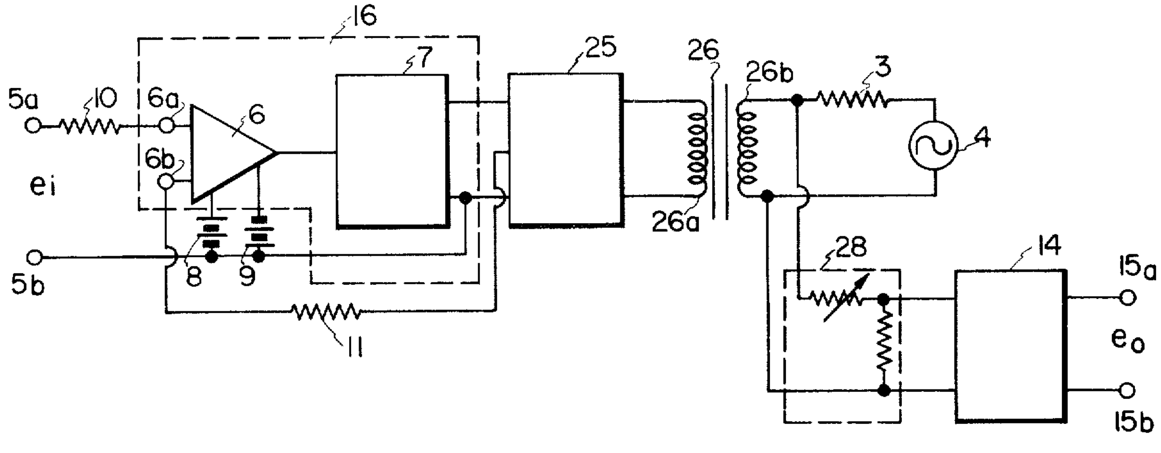
FIG. 9 is also a schematic diagram of still a different structure similar to that of FIG. 8.

While the scheme illustrated in FIG. 6 is effective in eliminating the need for a feedback winding on the transformer, it may also be seen that means may be provided for eliminating the need for a separate output winding on the transformer, as well. Two schemes for accomplishing this latter end are illustrated in FIGS. 8 and 9. In the structures shown in both FIG. 8 and in FIG. 9, that portion of circuit relating to the control and feedback features is identical to that shown in FIG. 6. In the structure shown in FIG. 8, the exciter winding 26*b* on the transformer 26 is in the form of a tapped winding having selectable taps 26*b*–1 26*b*–2 and 26*b*–3. The a.c. source 4 and the series resistor 3 are connected to the winding 26*b* in the manner heretofore described in connection with the other figures. Instead of an output winding on the transformer 26, an output connection is made to the exciter winding 26*b*. A pair of leads interconnect the output rectifier 14 to the terminals of the winding 26*b*. One such lead is connected directly to the lower terminal of the winding 26*b*. The other such lead is connected to the movable arm of a switch 27 which may, in turn, be connected to any one of the several taps 26*b*–1, 26*b*–2 or 26*b*–3. The facility for selecting between the several taps on the transformer winding 26*b* has the effect of being able to select the turns ratio between the exciter winding and the vertical output winding whereby to effect a selection of the gain developed in the transformer as may be required for any particular application.

In lieu of the provision a tapped winding on the transformer as shown in FIG. 8, the relative magnitude of the signal applied from the winding 26*b* to the input of the output rectifier 14 may be accomplished by use of a voltage divider 28 as shown in FIG. 9. As there is shown the voltage divider 28 is connected directly across the terminal leads of the winding 26*b* with the input to the rectifier 14 connected across the lower or fixed resistance portion of the voltage divider.

In the structures illustrated in both of FIGS. 8 and 9, once the desired transfer relationship has been established, variations in the output signal will be under the control of the variable impedance of the current limiter 7. The current limiter 7 is, in turn, under the control of the input signal. Again, there is provided a signal transducer which faithfully transmits a signal proportional to the input signal and yet provides conductive isolation between the input and output of the system.

Figure 10:
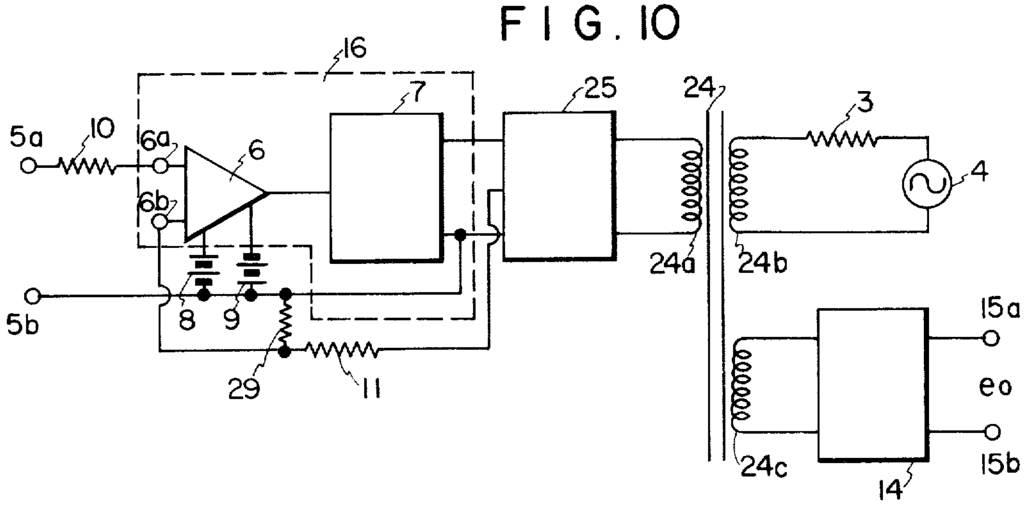
FIG. 10 is a schematic diagram of a modification of the circuit of FIG. 6.

The structure illustrated in FIG. 10 is substantially identical to that shown in FIG. 6 but modified to provide voltage feedback instead of current feedback. To that end, the resistor 29 is connected between the second input terminal 6*b* of the amplifier 6 and the common lead.

Figure 11:
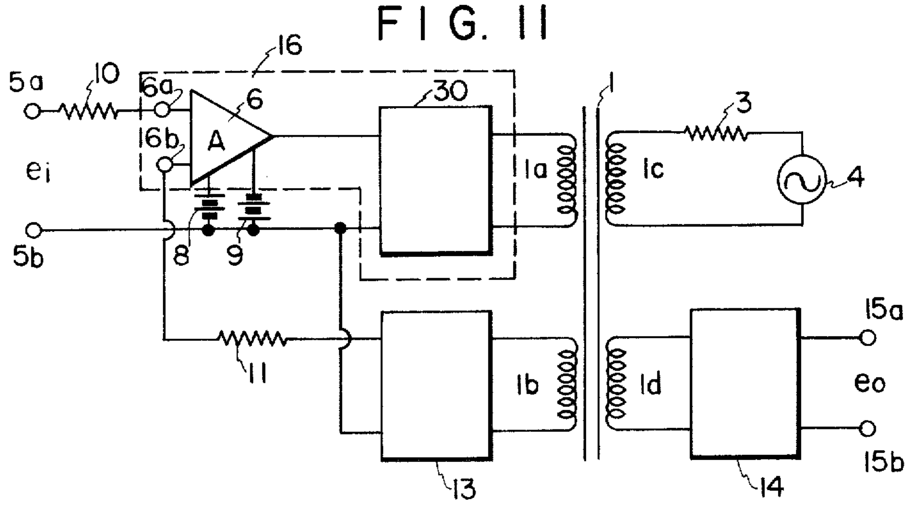
FIG. 11 is a schematic diagram of yet another circuit configuration also embodying the present invention.
Figure 12:
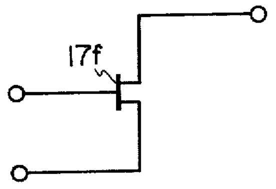
FIG. 12 is a schematic representation of a circuit element suitable for use in the circuit of FIG. 11.

All of the circuits discussed thus far have employed a transistor to accomplish the current limiting feature. Such transistors operate in a d.c. mode of conductivity control. In FIGS. 11 through 16 there is shown a circuit wherein the current limiting may be accomplished in an a.c. mode. The circuit illustrated in block diagram form in FIG. 11 is identical to the circuit illustrated in FIGS. 2*a* and 2*b* with the exception that the rectifier 12 of FIG. 2 has been eliminated and the d.c. mode current limiter 7 of FIGS. 2*a* and 2*b* has been replaced by an a.c. mode circuit limiter 30. An example of such an a.c. mode current limiter is shown, in FIG. 12, as a field effect transistor (FET) 17*f*. Thus, in the circuit of FIG. 11, the upper terminal of the transformer winding 1*a* may be directly connected one of the symmetrically conductive electrodes of the FET 17*f*, the other of the symmetrically conductive electrodes being connected through the bias battery 9 to the common lead connected, in turn to the other terminal of the winding 1*a*. The gate electrode of the FET 17*f* is connected directly to the output terminal of the error amplifier 6. Since the FET is a symmetrically conductive device, there is no need to rectify the signal developed in the winding 1*a* of the transformer 1. A control signal applied to the gate electrode of the FET is effective to control the current flow through the FET in either direction; it still fulfills the basic requirement of the present invention of providing a signal controlled variable impedance element in the control winding circuit.

Figure 13:
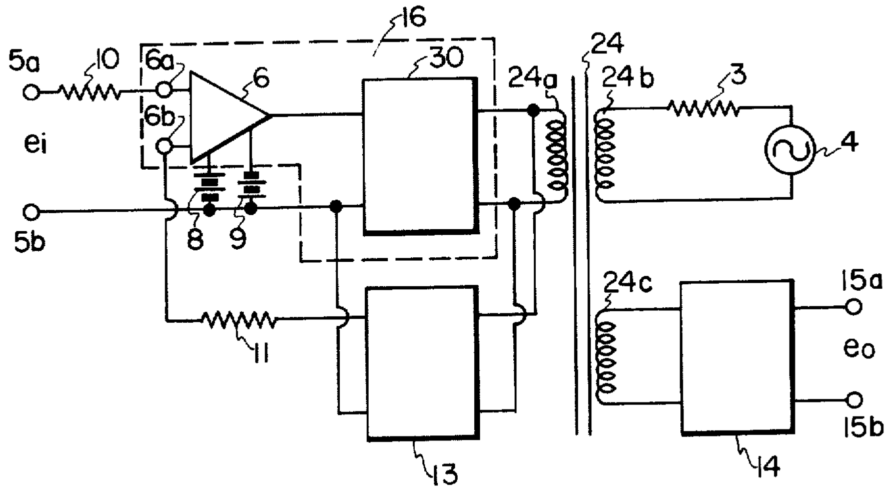
FIGS. 13, 14, 15 and 16 are schematic diagrams of a somewhat different structures but similar to that shown in FIG. 11.

In FIG. 13, there is illustrated a modification of the structure shown in FIG. 11. In this form, the feedback winding is eliminated, the rectifier 13 is connected across the terminal of the control winding 24*a* of the transformer 24 much in the same manner as was discussed in connection with the structure shown in FIG. 6.

Figure 14:
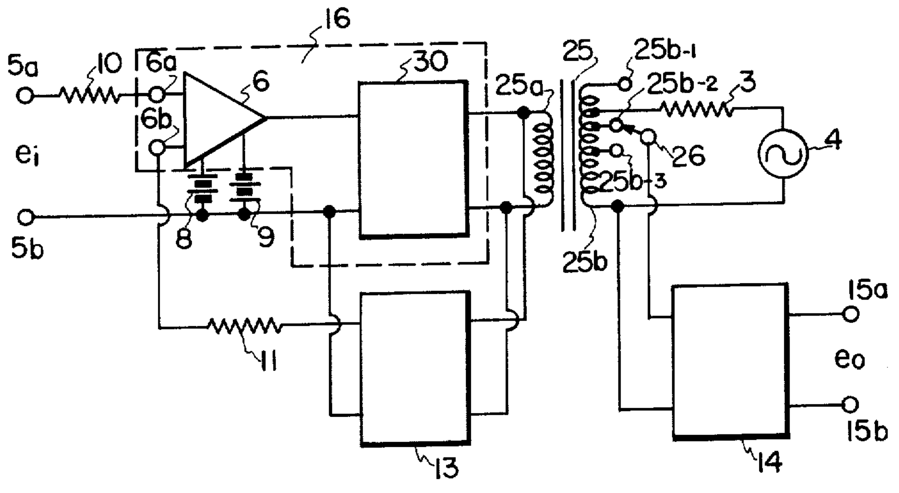

The form of the structure illustrated in FIG. 14 is identical with that shown in FIG. 13 with the exception that a separate output winding has been eliminated, with the output signal being derived from a tapped transformer winding 25*b* in the same manner as was discussed in connection with FIG. 8.

Figure 15:
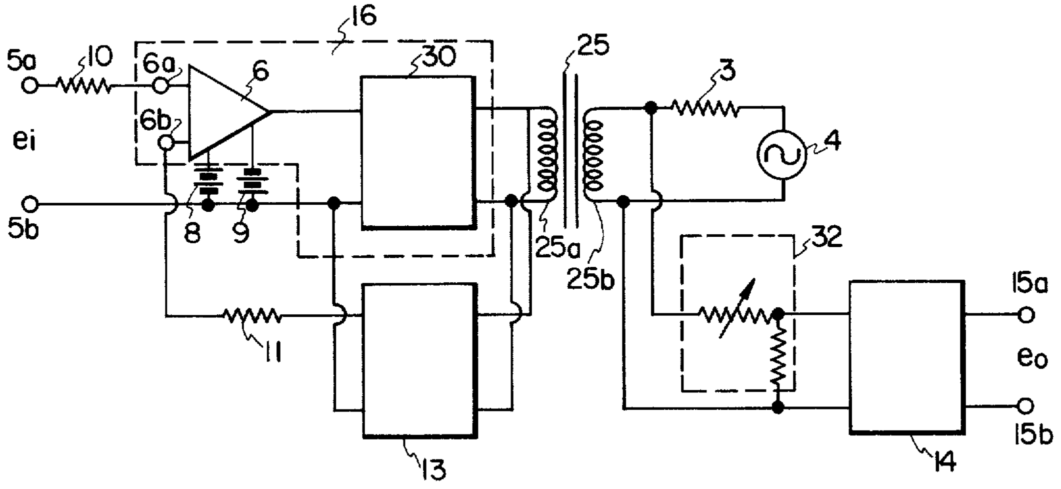

Similarly, the circuit diagrammatically illustrated in FIG. 15 is identical to that of FIG. 13 with the exception that the separate output winding has been eliminated. The output signal is derived from the exciter winding 25*b* of the transformer 25 and applied to the output rectifier 14 through a voltage divider 32 in substantially the same way as that discussed in connection with the circuit of FIG. 9.

Figure 16:
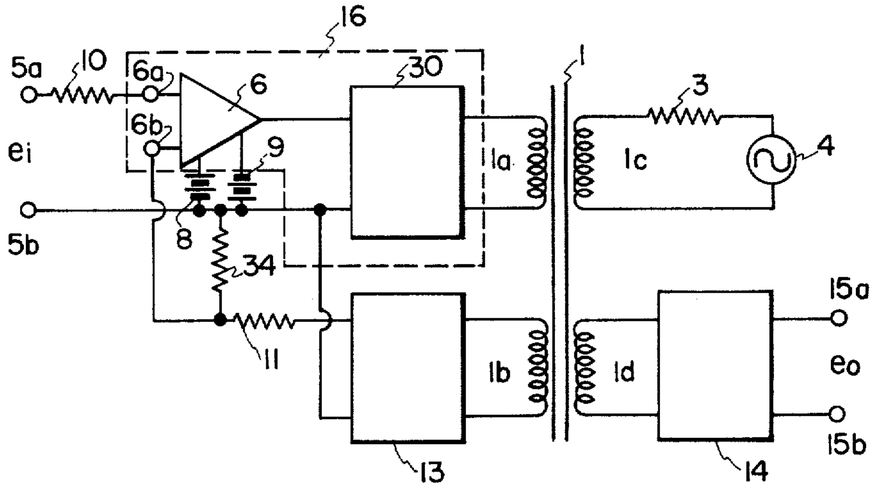

Again, the circuit illustrated in FIG. 16 is identical to that shown in FIG. 11 with the exception that means are provided establishing a voltage feedback signal instead of a current feedback signal. To this end a resistor 34 is connected between the second input terminal 6*b* of the amplifier 6 and the common lead.

Thus it may be seen that there has been provided, in accordance with the present invention, an improved signal transducer capable of d.c. to d.c. transmission while maintaining conductive isolation between the input circuit and the output circuit. This objective has been accomplished without the use of either mechanical or electronic signal choppers.

The embodiments of the invention in which an exclusive property or privilege is claimed are defined as follows:

1. An isolating signal transducer comprising, a transformer having at least a control winding and an exciter winding, a fixed impedance member serially connected with respect to said exciter winding, means for applying a substantially constant a.c. excitation signal through said fixed impedance member to said exciter winding, a signal controlled variable impedance means connected across said control winding whereby to control the loading of said transformer windings in accordance with an applied d.c. control signal, means for applying an input control signal to said variable impedance means to effect a control thereof, and means for deriving an output signal from said transformer corresponding to the input control signal but conductively isolated thereform, said means for applying said input control signal to said variable impedance means comprising a differential amplifier.

2. An isolating signal transducer as set forth in claim 1 wherein said variable impedance means comprises a transistor having a control electrode connected to be controlled by an output signal from said differential amplifier, said transistor having a controlled conductive path connected across said control winding of said transformer.

3. An isolating signal transducer as set forth in claim 2 wherein said transistor is a field effect transistor.

4. An isolating transducer as set forth in claim 1 including means for deriving a feedback signal from said transformer corresponding to said input signal, and means for applying said feedback signal to an input of said differential amplifier.

5. An isolating transducer as set forth in claim 4 wherein said means for deriving said feedback signal comprises a separate feedback winding on said transformer, and rectifier means connected to said separate feedback winding.

6. An isolating transducer as set forth in claim 4 wherein said means for deriving said output signal comprises a separate output winding on said transformer, and rectifier means connected to said separate output winding.

7. An isolating transducer as set forth in claim 4 wherein said means for deriving said feedback signal comprises a separate rectifier means connected across said control winding.

8. An isolating transducer as set forth in claim 4 wherein said means for deriving said output signal comprises a separate rectifier means connected across said exciter winding of said transformer.

* * * * *